(12) United States Patent
Toi et al.

(10) Patent No.: US 8,275,973 B2
(45) Date of Patent: Sep. 25, 2012

(54) RECONFIGURABLE DEVICE

(75) Inventors: Takao Toi, Tokyo (JP); Toru Awashima, Tokyo (JP); Taro Fujii, Kanagawa (JP); Toshiro Kitaoka, Kanagawa (JP); Koichiro Furuta, Kanagawa (JP); Masato Motomura, Kanagawa (JP)

(73) Assignees: NEC Corporation, Tokyo (JP); Renesas Electronics Corporation, Kawasaki-Shi, Kanagawa (JP)

( * ) Notice: Subject to any disclaimer, the term of this patent is extended or adjusted under 35 U.S.C. 154(b) by 439 days.

(21) Appl. No.: 12/457,649

(22) Filed: Jun. 17, 2009

(65) Prior Publication Data

US 2009/0319754 A1 Dec. 24, 2009

(30) Foreign Application Priority Data

Jun. 18, 2008 (JP) .................................. 2008-159267

(51) Int. Cl.
*G06F 15/00* (2006.01)
*G06F 15/76* (2006.01)
(52) U.S. Cl. .......................................................... 712/15
(52) U.S. Cl. ..................................................................
(58) Field of Classification Search ........................ None
See application file for complete search history.

(56) References Cited

U.S. PATENT DOCUMENTS

| 6,480,937 | B1 * | 11/2002 | Vorbach et al. ............... 711/122 |
| 7,523,292 | B2 | 4/2009 | Fujii et al. |
| 7,844,796 | B2 * | 11/2010 | Vorbach et al. ................. 712/18 |
| 2004/0078093 | A1 | 4/2004 | Fujii et al. |
| 2004/0103264 | A1 | 5/2004 | Fujii et al. |
| 2006/0031595 | A1 * | 2/2006 | Vorbach et al. .................... 710/8 |
| 2007/0083730 | A1 * | 4/2007 | Vorbach et al. ................. 712/10 |

FOREIGN PATENT DOCUMENTS

| JP | 3987782 | 7/2007 |
| JP | 3987783 | 7/2007 |

* cited by examiner

*Primary Examiner* — Corey S Faherty
(74) *Attorney, Agent, or Firm* — McGinn IP Law Group, PLLC

(57) ABSTRACT

A reconfigurable device comprises a plurality of processing elements, a main memory unit that stores plural pieces of circuit configuration information, a cache unit that caches circuit configuration information forwarded to at least one of the processing elements from the main memory unit, and a cache control unit that controls forwarding of circuit configuration information from the cache unit to the processing element. The cache control unit selects circuit configuration information which must be forwarded to each processing element. When the selected circuit configuration information is not stored in the cache unit, the cache control unit reads out the circuit configuration information from the main memory unit, stores the read-out circuit configuration information in the cache unit, and sends forward the circuit configuration information to the processing element from the cache unit.

20 Claims, 8 Drawing Sheets

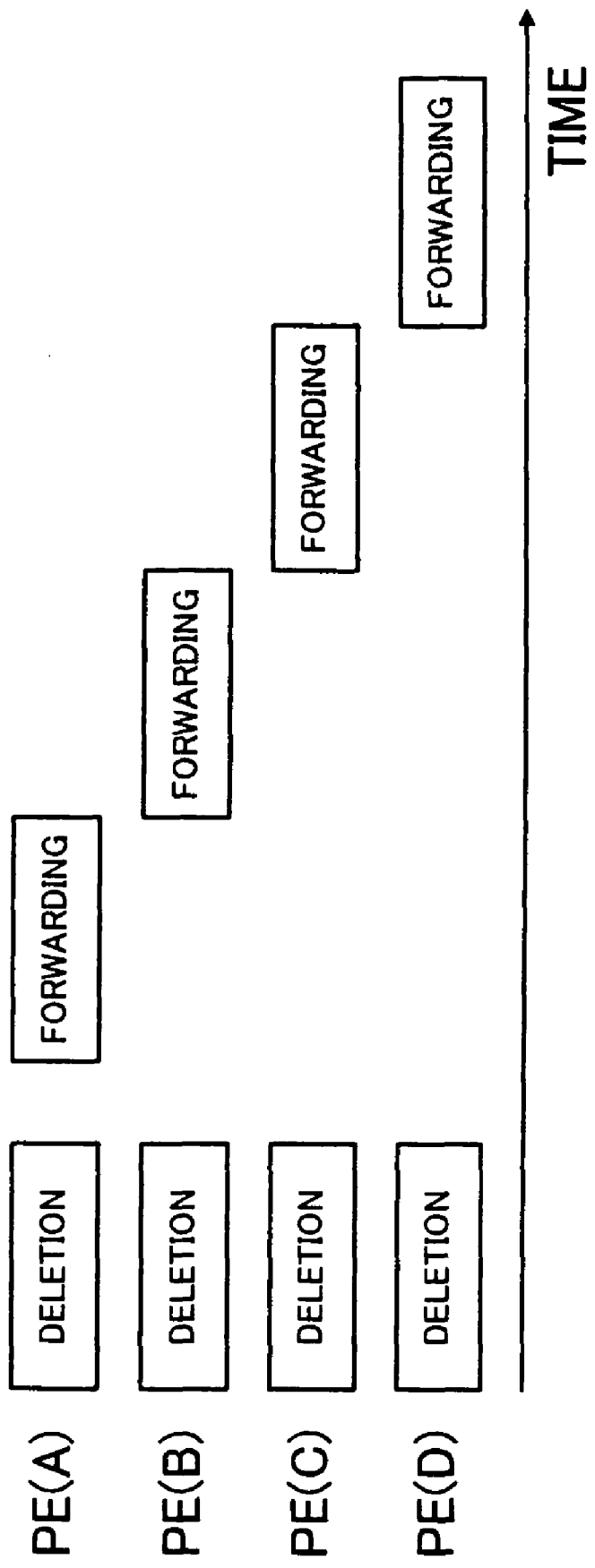

RECONFIGURABLE DEVICE

INCORPORATION BY REFERENCE

This application is based on Japanese Patent Application No. 2008-159267 filed on Jun. 18, 2008 and including specification, claims, drawings and summary. The disclosure of the above Japanese Patent Application is incorporated herein by reference in its entirety.

TECHNICAL FIELD

The present invention relates to a reconfigurable device enabling dynamical reconfiguration of a circuit.

BACKGROUND ART

Recently, reconfigurable devices, such as an FPGA (Field Programmable Gate Array) and a DRP (Dynamically Reconfigurable Processor), are getting attention. Those devices have characteristics of realizing about the same performance as that of an exclusive logic circuit, and enabling dynamic reconfiguration of a circuit.

For example, Japanese Patent No. 3987782 and Japanese Patent No. 3987783 disclose an example of the architecture of a DRP.

An FPGA and a DRP perform a circuit operation in accordance with a configuration code stored in advance in a configuration memory in those devices.

Therefore, to realize a large-scale circuit, it is necessary to store a large number of configuration codes. In particular, like a DRP, when a plurality of configurations are dynamically changed over a time axis, it is necessary to store a further large number of configuration codes.

However, when the size of a configuration memory increases, the ratio that the configuration memory occupies in a whole computation unit increases, while the ratio of an arithmetic circuit decreases. Accordingly, a distance to the arithmetic circuit of another computation unit (in other words, a distance between computation units) increases, so that a wiring delay may increase.

In order to suppress any increment of the wiring delay, for example, a technique of using a transistor which operates at a fast speed is considerable. However, a transistor which operates at a fast speed generally has a large leak current, resulting in increment of power consumption.

SUMMARY

The present invention has been made in view of the foregoing problem, and it is an exemplary object of the present invention to provide a reconfigurable device which suppresses any increment of power consumption and any reduction of an operation speed by efficiently having circuit configuration information and enabling forwarding thereof even if a large-scale circuit is realized.

In order to achieve the exemplary object, a reconfigurable device of the present invention includes:

a plurality of processing elements;

a main memory unit that stores plural pieces of circuit configuration information each of which is for causing each processing element to realize an electronic circuit;

a cache unit that caches circuit configuration information forwarded to at least one of the processing elements from the main memory unit; and a cache control unit that selects circuit configuration information which must be forwarded to each processing element, and when the selected circuit configuration information is not stored in the cache unit, reads out the circuit configuration information from the main memory unit, stores the read-out circuit configuration information in the cache unit, and sends forward the circuit configuration information to the processing element from the cache unit.

Moreover, another reconfigurable device of the present invention includes:

a plurality of processing elements;

main memory means for storing plural pieces of circuit configuration information each of which is for causing each processing element to realize an electronic circuit;

cache means for caching circuit configuration information forwarded to at least one of the processing elements from the main memory means; and cache control means for selecting circuit configuration information which must be forwarded to each processing element, and when the selected circuit configuration information is not stored in the cache means, reading out the circuit configuration information from the main memory means, storing the read-out circuit configuration information in the cache means, and sending forward the circuit configuration information to the processing element from the cache means.

BRIEF DESCRIPTION OF THE DRAWINGS

The object and other objects and advantages of the present invention will become more apparent upon reading of the following detailed description and the accompanying drawings in which:

FIG. 8 is a diagram for explaining a forwarding order of circuit configuration information.

EXEMPLARY EMBODIMENT

Hereinafter, an explanation will be given of a reconfigurable device of an embodiment with reference to accompanying drawings. In the embodiment, an explanation will be given of an example case where the reconfigurable device of the present invention is applied to a DRP (Dynamically Reconfigurable Processor). Note that the reconfigurable device of the present invention can be also applied to an FPGA (Field Programmable Gate Array).

First, an explanation will be given of a PE (Processing Element) 10 of the reconfigurable device of the embodiment. In the reconfigurable device, a plurality of PEs 10 are laid out in a reticular pattern, and each PE 10 is connected to another PE 10 via a data wire and a flag wire. In order to facilitate understanding, FIG. 1 shows only one PE 10, and an explanation will be given of the structure of one PE 10 and the operation thereof.

Figure 1:
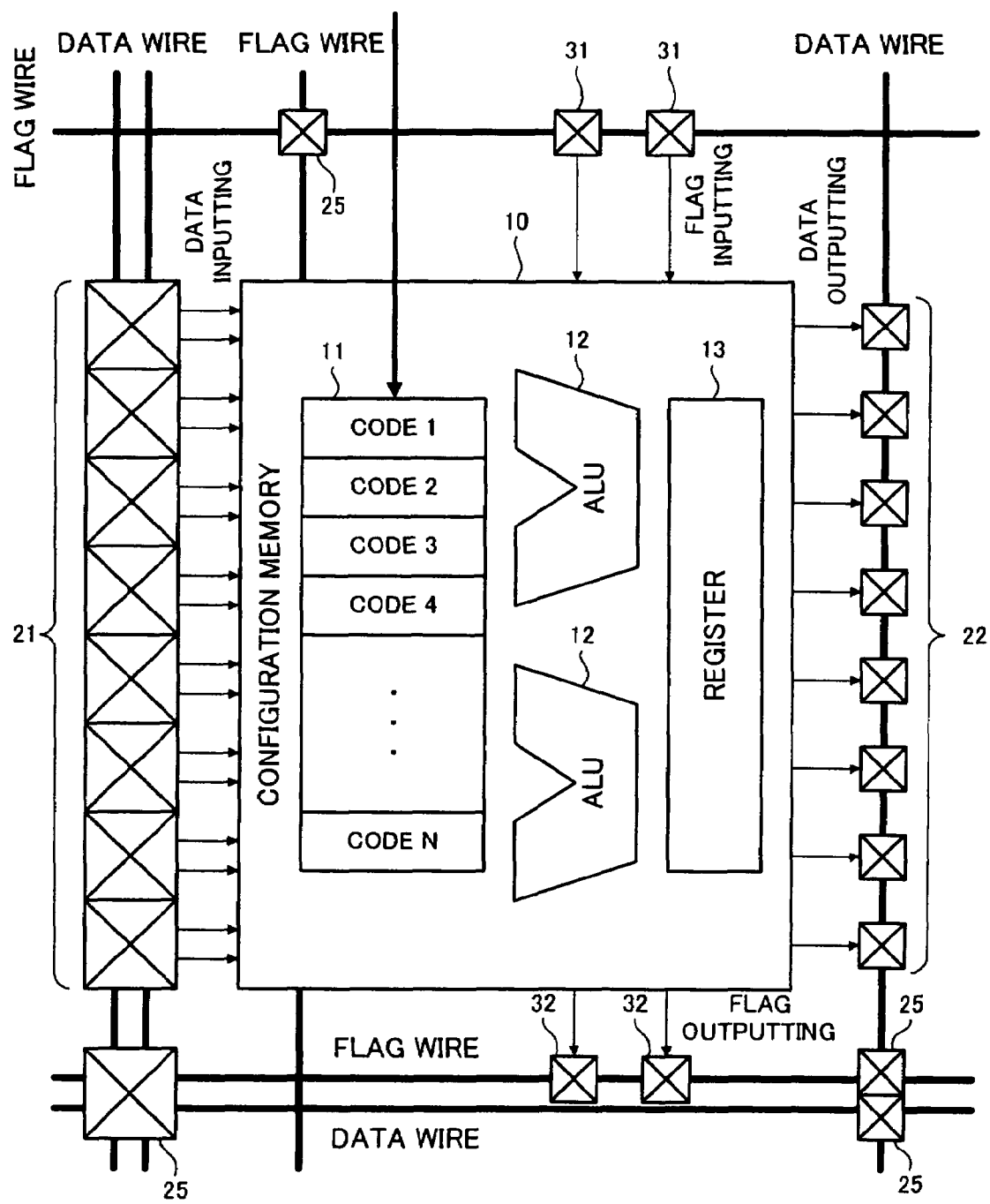
FIG. 1 is a diagram showing a structure of a processing element that a reconfigurable device of an embodiment of the present invention has.

As shown in FIG. 1, the PE 10 has a configuration memory (primary cache) 11, an ALU (Arithmetic Logic Unit) 12 and a register 13. Individual components of the PE 10 transmit/receive data among those via a non-illustrated data wire, and transmit/receive a flag among those via a non-illustrated flag wire.

The PE 10 performs a predetermined computation on data supplied from another PE 10 via a data wire, and supplies data acquired by the computation to another PE 10 via the data wire. Moreover, the PE 10 receives a flag supplied from another PE 10 via a flag wire. Further, the PE 10 supplies a flag to another PE 10 via the flag wire.

The configuration memory 11 stores a configuration code (hereinafter, "circuit configuration information") comprised of an instruction content (hereinafter, "computation information") to the ALU 12, and wire connection information of wire connection switches 21, 22, 25, 31, and 32.

The configuration memory 11 of each PE 10 has a capacity sufficient for storing plural pieces of circuit configuration information each corresponding to a configuration face (hereinafter, "context") dynamically changed over a time axis. As shown in FIG. 1, in the embodiment, the configuration memory 11 has a capacity sufficient for storing plural pieces of circuit configuration information (code 1 to code N) corresponding to N number of contexts.

The ALU 12 performs computation on supplied data in accordance with computation information stored in the configuration memory 11. At this time, the ALU 12 uses computation information contained in circuit configuration information stored in a designated area in the configuration memory 11.

The register 13 temporarily stores, for example, computation-result data and intermediate data in computation both output by the ALU 12.

The wire connection switch 21, 22, 25 connects a corresponding PE 10 (a PE 10 having a configuration memory 11 storing wire connection information) and another PE 10 (e.g., an adjoining PE 10) together via a data wire in accordance with the individual corresponding wire connection information.

The wire connection switch 31, 32, 25 connects a corresponding PE 10 (a PE 10 having a configuration memory 11 storing wire connection information) and another PE 10 (e.g., an adjoining PE 10) together via a flag wire in accordance with the individual corresponding wire connection information.

The wire connection switch 21, 22, 25, 31, 32 connects data wires or flag wires in accordance with wire connection information contained in circuit configuration information stored in a designated area in the configuration memory 11. Note that the wire connection switch 25 is positioned at an intersection of data wirings or flag wirings.

Next, an explanation will be given of a basic structure of the reconfigurable device 100 of the embodiment with reference to FIG. 2.

Figure 2:
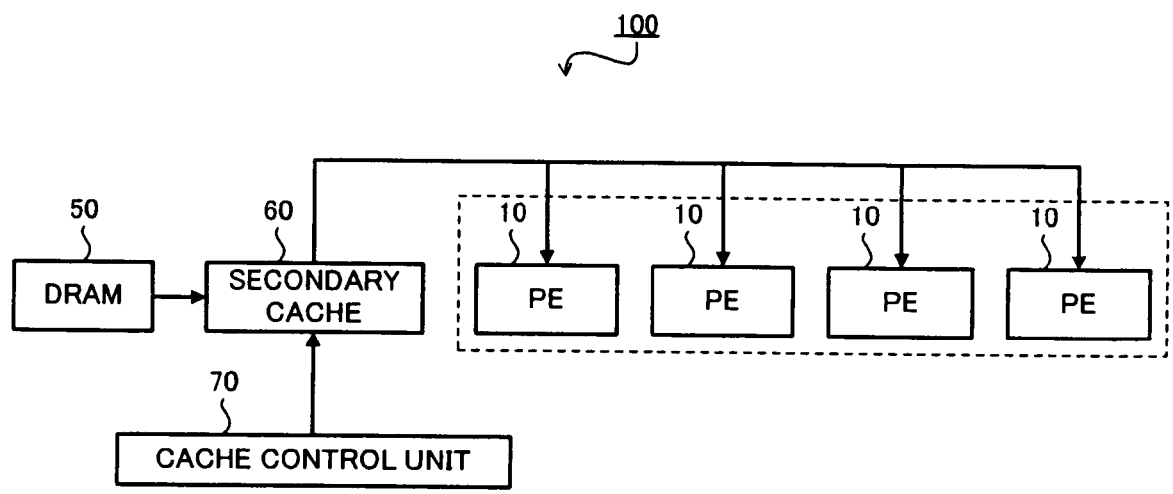
FIG. 2 is a block diagram showing a basic structure of the reconfigurable device of the embodiment.

As shown in FIG. 2, the reconfigurable device 100 has the plurality of PEs 10, a DRAM (Dynamic Random Access Memory) 50, a secondary cache memory (hereinafter, "secondary cache") 60, and a cache control unit 70.

The DRAM 50 stores circuit configuration information, for causing each of the plural PEs 10 to realize an electronic circuit, by what corresponding to total contexts. The DRAM 50 is a large-capacity memory, and functions as a main memory unit.

The secondary cache 60 caches circuit configuration information forwarded to any one of the plural PEs 10 from the DRAM 50. The secondary cache 60 functions as a cache unit.

The cache control unit 70 selects circuit configuration information which must be forwarded to each of the plural PEs 10. The cache control unit 70 reads out the selected circuit configuration information from the DRAM 50 if the circuit configuration information is not stored in the secondary cache 60, and stores the read-out circuit configuration information in the secondary cache 60. The cache control unit 70 sends forward the selected circuit configuration information to the PE 10 from the secondary cache 60.

Next, with reference to FIGS. 3 and 4, an explanation will be given of how the secondary cache 60 is laid out and connected to a PE 10 (in a narrow sense, the configuration memory 11 in the PE 10) in the reconfigurable device 100.

Figure 3:
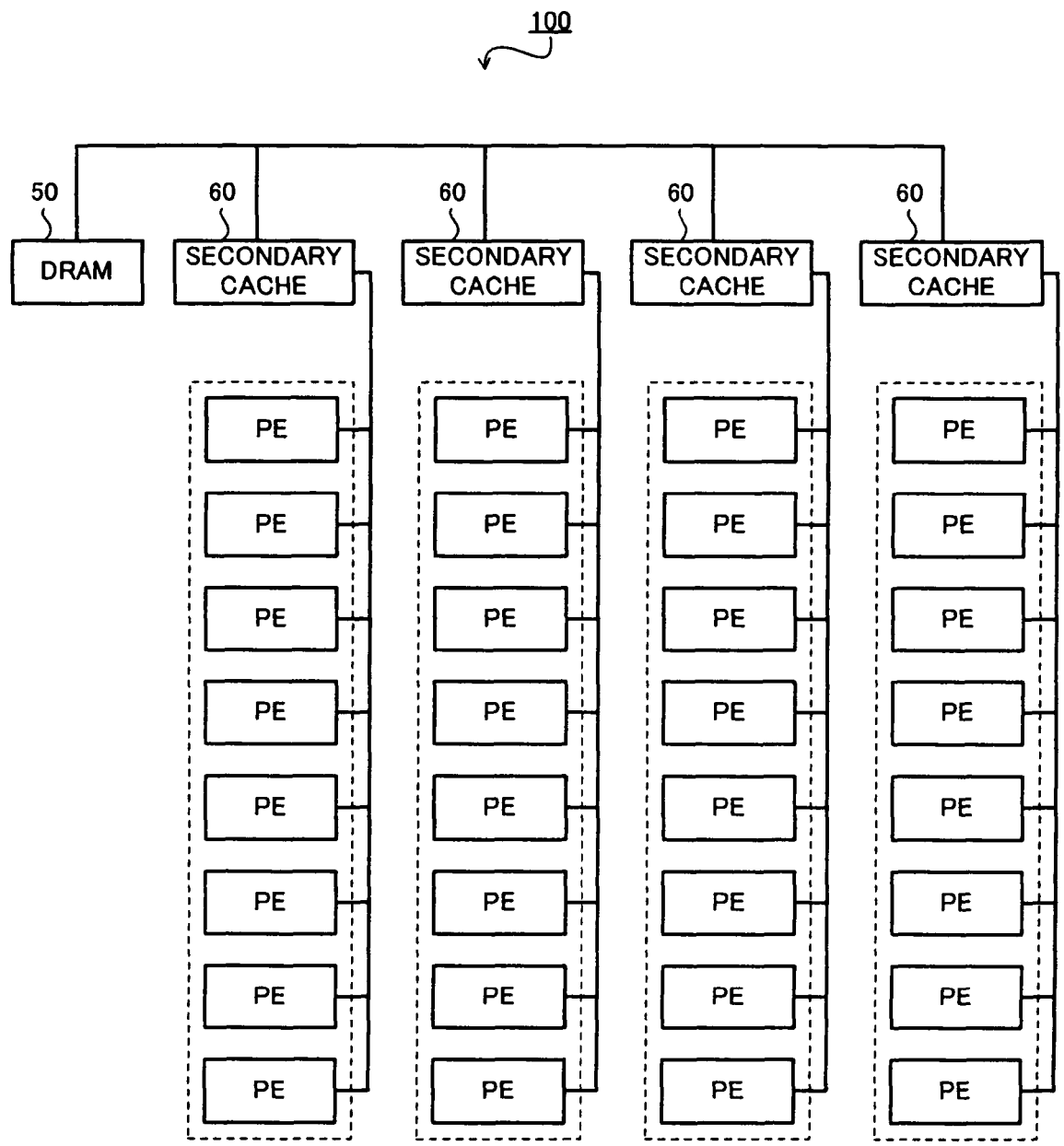
FIG. 3 is a block diagram showing a first layout of a secondary cache and a processing element and a connection example of those.

FIG. 3 shows an example case where a group (element group) comprised of a secondary cache 60 and a plurality of PEs 10 is laid out in one direction.

In such a structure, a secondary cache 60 can forward circuit configuration information to the configuration memory 11 of each PE 10 belonging to a corresponding element group.

Figure 4:
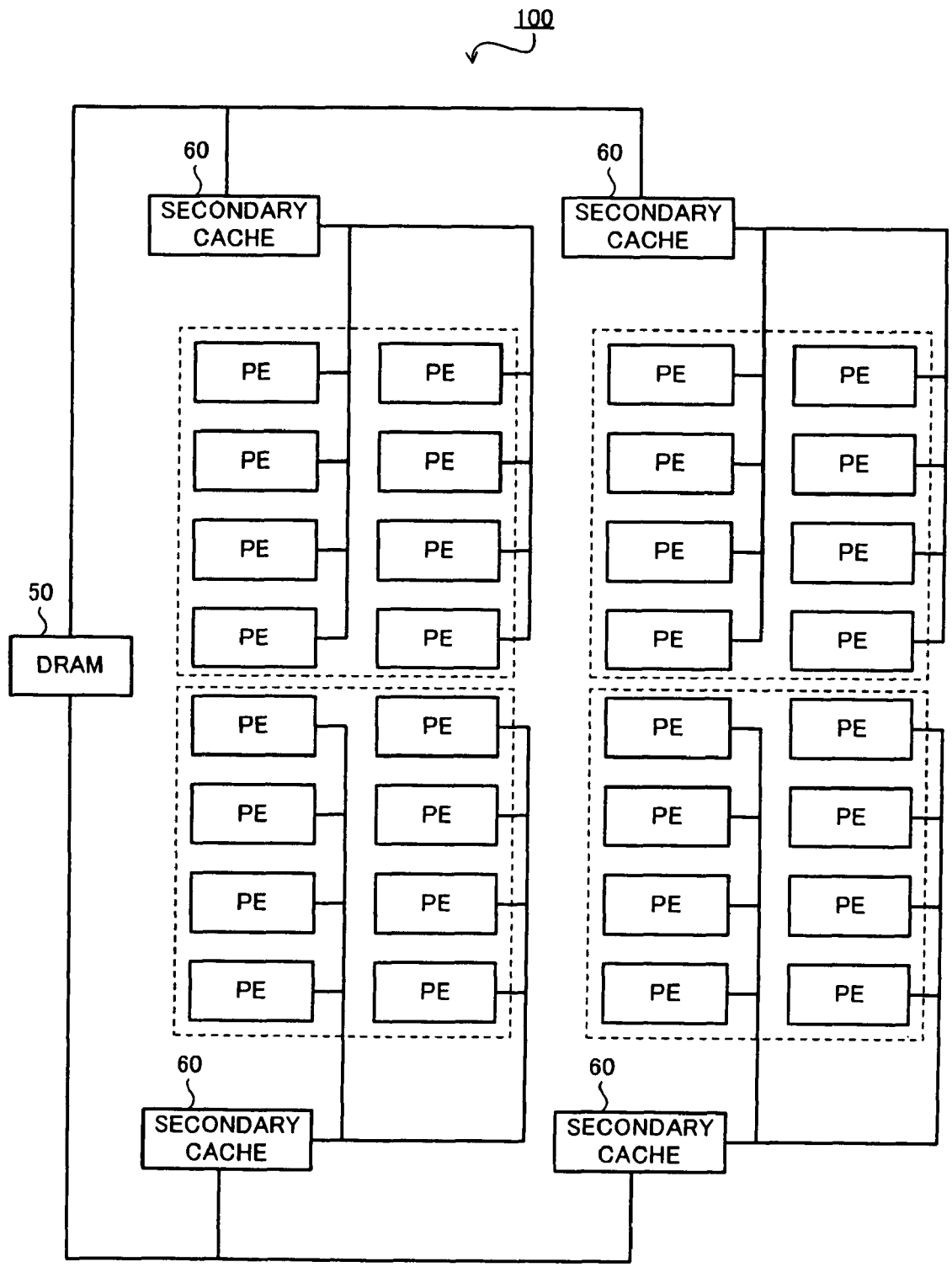
FIG. 4 is a block diagram showing a second layout of a secondary cache and a processing element and a connection example of those.

FIG. 4 shows an example case where element groups corresponding to individual secondary caches 60 are laid out in a matrix. In the example shown in FIG. 4, each element group comprises eight (four rows by two columns) PEs 10.

According to such a structure, a secondary cache 60 can forward circuit configuration information to the configuration memory 11 of each PE 10 belonging to a corresponding element group.

Next, an explanation will be given of an operation of the reconfigurable device 100 of the embodiment with reference to FIGS. 5 to 8.

Figure 5:
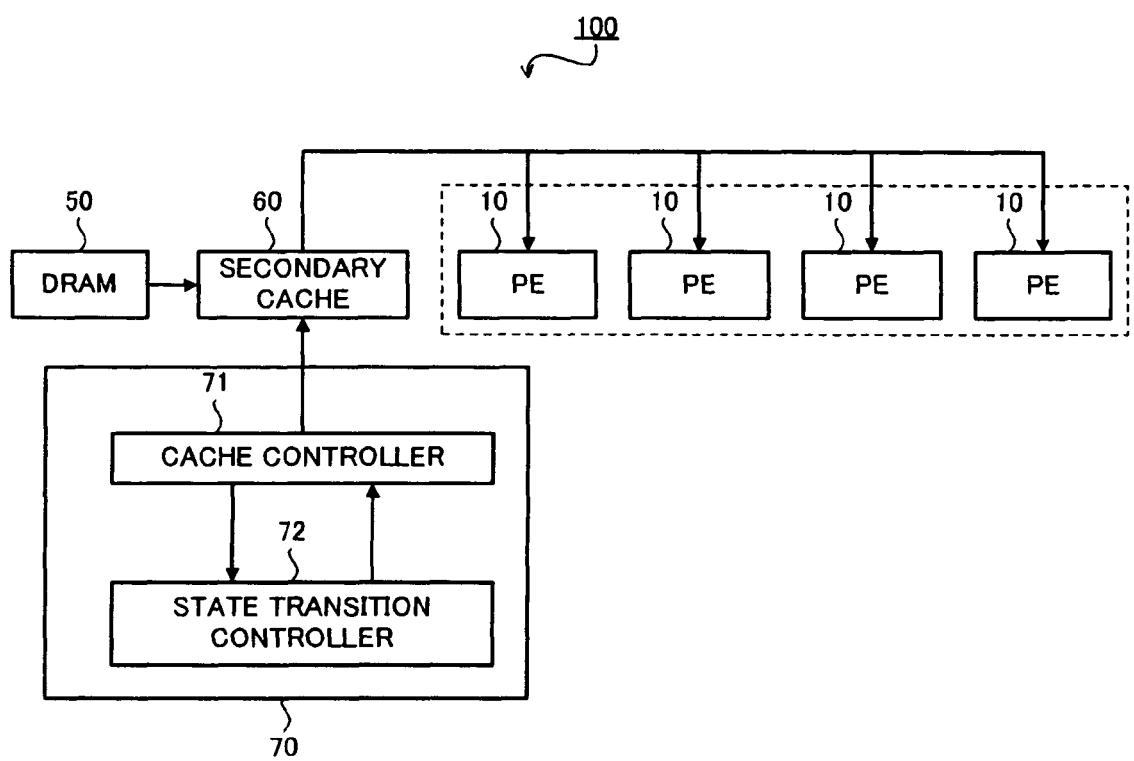
FIG. 5 is a block diagram for explaining an operation of the reconfigurable device.

First, a structure of the reconfigurable device 100 shown in FIG. 5 will be simply explained. Shown in the figure is an example case where a secondary cache 60 is laid out for each element group having plural PEs 10 arranged in one direction. To facilitate understanding, FIG. 5 shows a structure having one element group and a secondary cache 60.

As shown in FIG. 5, the reconfigurable device 100 has the plural PEs 10, the DRAM 50, the secondary cache 60, and the cache control unit 70. Regarding the PE 10 and the DRAM 50, those units have the same structure as the basic structure explained with reference to FIG. 2, so that the explanation thereof will be omitted.

The secondary cache 60 is a memory device which operates at a faster speed than the DRAM 50, and comprises, for example, a dual port RAM. When the secondary cache 60 comprises a dual port RAM, it becomes possible to forward circuit configuration information to the configuration memory 11 while reading out the circuit configuration information from the DRAM 50.

The cache control unit 70 comprises a cache controller 71 and a state transition controller 72.

The cache controller 71 controls a multilevel (two level) cache comprised of the configuration memory 11 and the secondary cache 60. The following explanations (a) to (d) are major control contents of the cache controller 71:

(a) which circuit configuration information and which timing the circuit configuration information is forwarded to the configuration memory 11 of the PE 10 from the secondary cache 60;

(b) which circuit configuration information among plural pieces of circuit configuration information stored in the configuration memory 11 and which timing the circuit configuration information is discarded;

(c) Which circuit configuration information and which timing the circuit configuration information is forwarded to the secondary cache 60 from the DRAM 50; and (d) which circuit configuration information among plural pieces of circuit configuration information stored in the secondary cache 60 and which timing the circuit configuration information is discarded.

Note that the cache controller 71 can be substituted by a CPU (Central Processing Unit).

Figure 6:
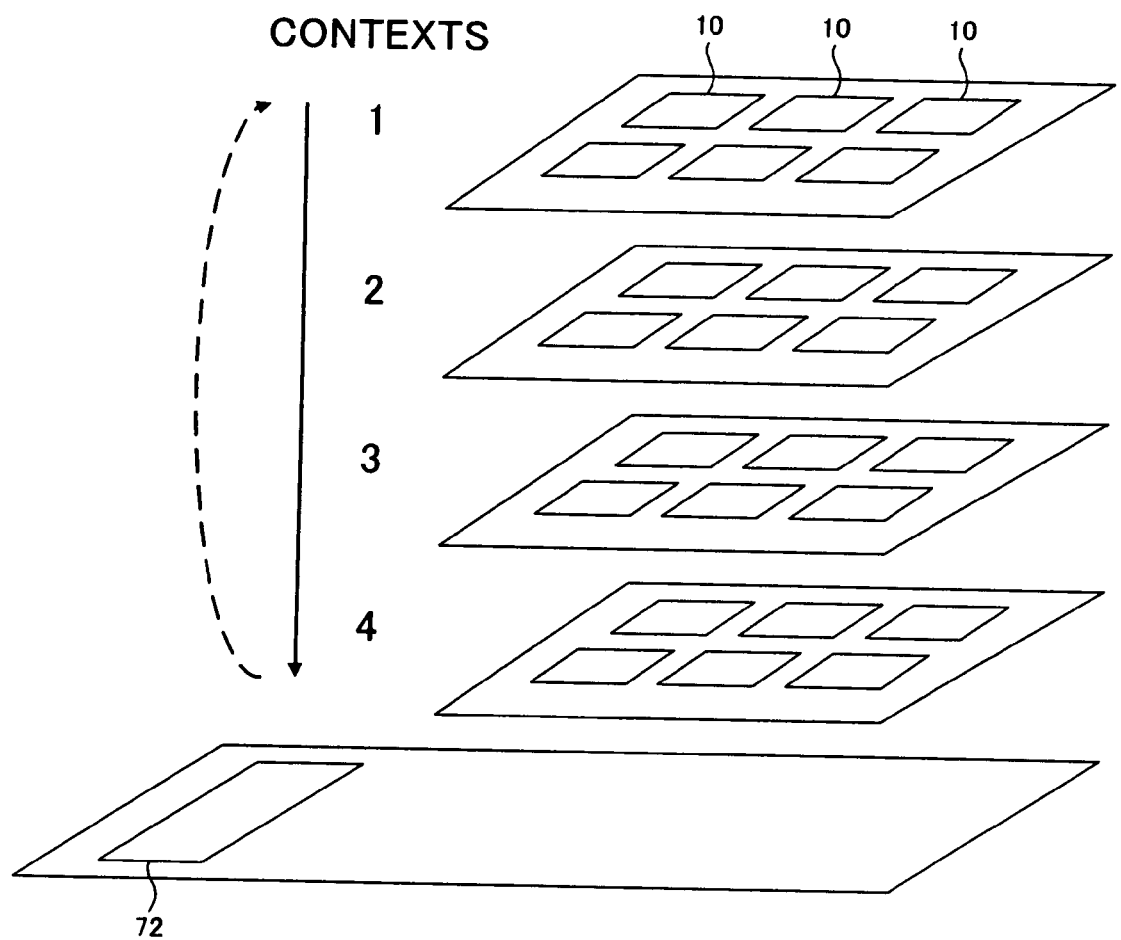
FIG. 6 is a diagram for explaining a context changeover operation executed by a state transition controller.

The state transition controller 72 controls a state that the reconfigurable device 100 can have. In particular, as shown in FIG. 6, the state transition controller 72 changes over contexts, thereby controlling a possible state of the reconfigurable device 100. The state transition controller 72 supplies a signal, indicating, for example, a timing of changing over the contexts, as control information to the cache controller 71.

The cache controller 71 determines which circuit configuration information must be forwarded and to which PE 10, based on the control information supplied from the state transition controller 72. When circuit configuration information which must be forwarded is stored in the secondary cache 60, the cache controller 71 sends forward such information to the PE 10. When such information is not stored in the secondary cache 60, the cache controller 71 reads out such information from the DRAM 50, stores the read-out information in the secondary cache 60, and sends forward such circuit configuration information to the PE 10.

More specifically, the state transition controller 72 detects e.g. an update timing of circuit configuration information of each PE 10 (context changeover timing) based on a state of inputting/outputting of each PE 10, a clock signal and so on. When the state transition controller 72 detects the update timing of circuit configuration information, the state transition controller 72 supplies information, indicating the update timing, as control information to the cache controller 71.

When such control information is supplied from the state transition controller 72, the cache controller 71 updates circuit configuration information based on the supplied control information.

More specifically, the cache controller 71 determines whether or not circuit configuration information of each PE 10 corresponding to a next context is stored in the secondary cache 60.

As a result, when the circuit configuration information is stored in the secondary cache 60, the cache controller 71 reads out the circuit configuration information corresponding to each PE 10 from the secondary cache 60, and sends forward the read-out information to the corresponding PE 10.

Conversely, when corresponding circuit configuration information is not stored in the secondary cache 60, the cache controller 71 reads out circuit configuration information of each PE 10 corresponding to a next context from the DRAM 50, and stores the read-out information in the secondary cache 60. Thereafter, the cache controller 71 reads out circuit configuration information corresponding to each PE 10 from the secondary cache 60, and sends forward the read-out information to the corresponding PE 10.

Each PE 10 writes circuit configuration information forwarded from the secondary cache 60 in an area (any one of segmented areas 1 to N shown in FIG. 1) of the configuration memory 11 specified by the cache controller 71. Updating of circuit configuration information is completed through the foregoing processes.

Figure 7:
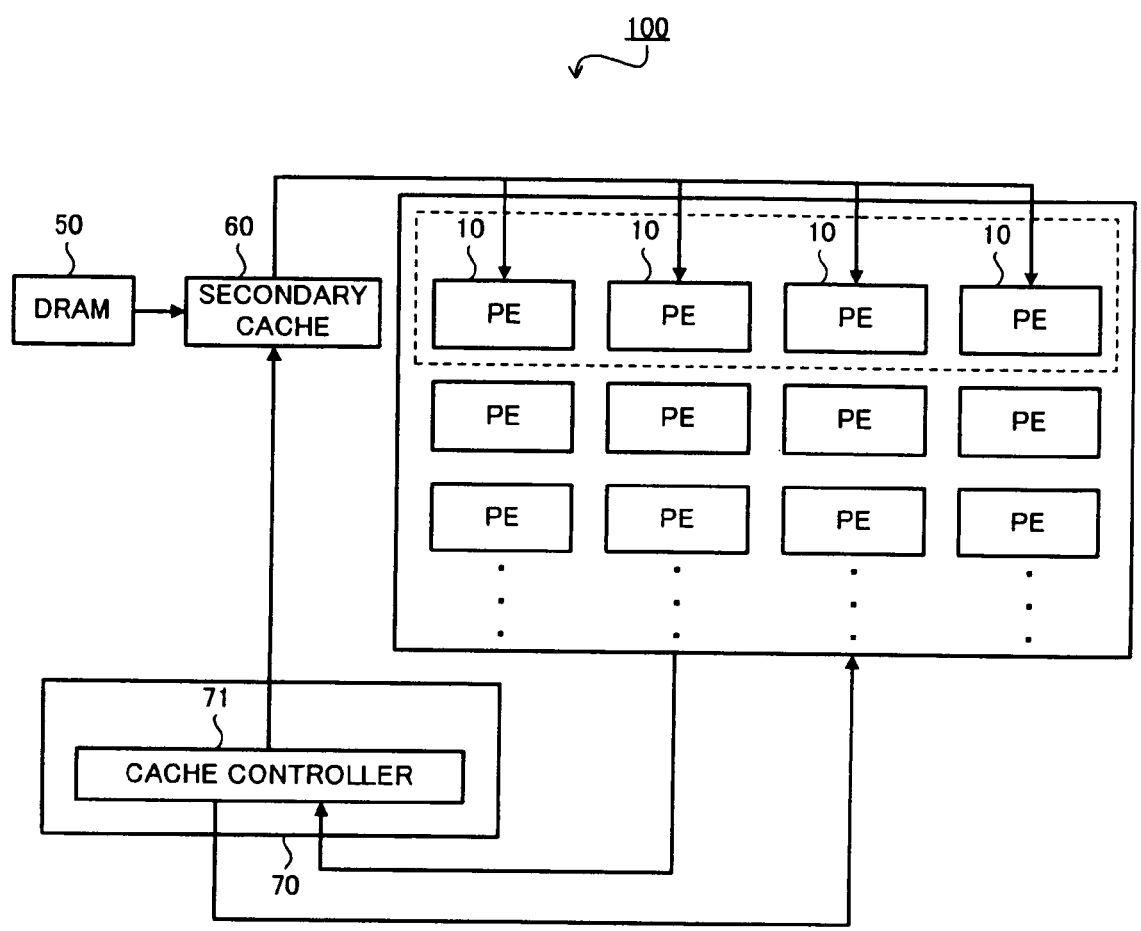
FIG. 7 is a block diagram for explaining an operation of a cache controller when a cache control unit does not have the state transition controller.

Note that FIG. 5 shows an example case where the cache control unit 70 has the state transition controller 72, but as shown in FIG. 7, the cache control unit 70 may employ a structure having no state transition controller 72.

According to such a structure, as shown in FIG. 7, the cache controller 71 directly monitors a state or the like of each PE 10, and detects an update timing of circuit configuration information of each PE 10.

Note that when a computation element is not a PE but is an LUT (Look Up Table) like an FPGA, the same is true of this case.

Next, an explanation will be given of how circuit configuration information cached in the secondary cache 60 is stored.

In the secondary cache 60, cached circuit configuration information is stored in association with identification information (e.g., a serial number) of a context and information indicating a forwarding-destination PE 10. However, when circuit configuration information indicates a specific code string, such circuit configuration information is not stored in the secondary cache 60. In the embodiment, when circuit configuration information is a code string (e.g., 0x00 in a hex number) indicating an NOP (No Operation) instruction, such circuit configuration information is not stored in the secondary cache 60.

The NOP instruction means "do nothing" when considered as an instruction of specifying an operation of a PE 10, and means "wire nothing" when considered as an instruction of configuring an electronic circuit.

When circuit configuration information read out from the DRAM 50 is a code string indicating an NOP instruction, the cache controller 71 does not cache the circuit configuration information in the secondary cache 60.

As explained above, in the secondary cache 60, by not storing circuit configuration information comprised of a code string indicating an NOP instruction, reduction of the data capacity of the secondary cache 60 can be accomplished. Moreover, from the standpoint of another aspect, circuit configuration information corresponding more large number of contexts can be stored in the secondary cache 60. In the latter case, it is expected that the hit rate of a cache in the secondary cache 60 is improved, resulting in improvement of the operation speed.

Next, with reference to FIG. 8, an explanation will be given of a procedure when circuit configuration information is forwarded from the secondary cache 60 to the plural PEs 10 connected thereto. As shown in FIG. 5, let us suppose that four PEs 10 (PE (A), PE (B), PE (C), and PE (D) in FIG. 8) are connected to the secondary cache 60.

The cache control unit 70 sends the same instruction pointer to each PE 10. Each PE 10 performs zero-clearing (i.e., setting a code string indicating an NOP instruction) on an area specified by the instruction pointer from the cache control unit 70 among plural segmented areas in the configuration memory 11.

This is because if a code string indicating an instruction other than an NOP instruction remains in an area specified by the instruction pointer from the cache control unit 70, a PE 10 executes unnecessary computation so that power consumption may increase, and a wire connection switch executes unexpected connection so that a circuit element may be damaged.

The cache control unit 70 reads out circuit configuration information corresponding to each PE 10 from the secondary cache 60, and successively sends forward the read-out information to each PE 10. At this time, as explained above, no code string indicating an NOP instruction is stored in the secondary cache 60, so that no circuit configuration information having such a code string is forwarded to a PE 10. This results in reduction of a forwarding time.

According to the above-explained reconfigurable device 100 of the embodiment, when it is desired to increase the number of contexts, it is unnecessary to increase the capacity of the configuration memory 11 of each PE 10. That is, it is possible to cope with increment of the number of contexts by only increasing the capacity of the secondary cache 60 which collectively stores circuit configuration information of a PE for each context. As a result, increment of a layout area originating from increment of the number of contexts can be suppressed as far as possible.

Reduction of the layout area of the configuration memory 11 results in shortening of distances among PEs 10, so that a wiring delay can be reduced.

Further, unlike the primary cache (configuration memory 11), the secondary cache 60 has a little requirement for reduction of a delay, so that the secondary cache 60 can be comprised of a transistor which operates at a slow speed but has a little leak current. Accordingly, power consumption can be reduced.

In the foregoing embodiment, circuit configuration information stored in the secondary cache 60 contains wire connection information of the wire connection switch 21, 22, 25, 31, 32 adjacent to a PE 10, in addition to computation information of the ALU 12. However, the computation information and the wire connection information may be stored in separate memories. In this case, a secondary cache for the computation information and a secondary cache for the wire connection information may be separately provided, and the cache control unit may control individual secondary caches.

In the foregoing embodiment, the explanation has been given of a case where the reconfigurable device is applied to a DRP. However, the reconfigurable device according to the present invention may be applied to an FPGA realized by an LUT, or a PLD on the basis of a product term.

As explained above, according to the present invention, by efficiently having circuit configuration information and enabling forwarding thereof, it is possible to realize a large-scale circuit without increment of power consumption and reduction of an operation speed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A reconfigurable device, comprising:
a plurality of processing elements;
a main memory unit that stores plural pieces of circuit configuration information each of which is for causing each of said processing elements to realize an electronic circuit;
a cache unit that caches circuit configuration information forwarded to at least one of the processing elements from the main memory unit; and
a cache control unit that selects circuit configuration information which must be forwarded to each of said processing elements, and when the selected circuit configuration information is not stored in the cache unit, reads out the circuit configuration information from the main memory unit, stores the read-out circuit configuration information in the cache unit, and sends forward the circuit configuration information to the processing element from the cache unit.

2. The reconfigurable device according to claim 1, wherein the cache control unit transmits a signal to said each of said processing elements, the signal being for specifying a memory area for storing circuit configuration information to be forwarded,
wherein said each of said processing elements sets a code string indicating a predetermined instruction in the specified memory area upon receiving the signal, and
wherein the cache control unit reads out the selected circuit configuration information from the main memory unit, stores the read-out circuit configuration information in the cache unit, and sends forward the circuit configuration information to said each of said processing elements from the cache unit only when the selected circuit configuration information comprises a code string other than a code string indicating the predetermined instruction.

3. The reconfigurable device according to claim 2, wherein the code string indicating the predetermined instruction comprises a code string indicating an NOP (No Operation) instruction.

4. The reconfigurable device according to claim 1, wherein the cache unit comprises a dual port RAM.

5. The reconfigurable device according to claim 1, further comprising a plurality of ones of the cache unit,
wherein each of the plurality of ones of the cache unit is associated with the plurality of processing elements, and caches circuit configuration information forwarded from the main memory unit to an associated processing element among the plurality of processing elements, and
wherein the cache control unit selects circuit configuration information which must be forwarded to each processing element, and when the selected circuit configuration information is not stored in the cache unit associated with the processing element, reads out the selected circuit configuration information from the main memory unit, stores the read-out circuit configuration information in the cache unit, and sends forward the circuit configuration information to the associated processing element from the cache unit.

6. The reconfigurable device according to claim 5, wherein a processing element group associated with each of the plurality of ones of the cache unit is arranged in one direction.

7. The reconfigurable device according to claim 5, wherein a processing element group associated with each of the plurality of ones of the cache unit is arranged in a matrix.

8. A reconfigurable device, comprising:
a plurality of processing elements;
main memory means for storing plural pieces of circuit configuration information each of which is for causing each of said processing elements to realize an electronic circuit;
cache means for caching circuit configuration information forwarded to at least one of the processing elements from the main memory unit; and
cache control means for selecting circuit configuration information which must be forwarded to each of said processing elements, and when the selected circuit configuration information is not stored in the cache unit, reading out the circuit configuration information from the main memory unit, storing the read-out circuit configuration information in the cache unit, and sending forward the circuit configuration information to the processing element from the cache unit.

9. The reconfigurable device according to claim 1, wherein said each of said processing elements sets a code string indicating an NOP (No Operation) instruction in a specified memory area, and
wherein the cache control unit reads out the selected circuit configuration information from the main memory unit, stores the read-out circuit configuration information in the cache unit, and sends forward the circuit configuration information to said each of said processing elements from the cache unit only when the selected circuit configuration information comprises a code string other than a code string indicating the NOP instruction.

10. The reconfigurable device according to claim 1, wherein circuit configuration information that comprises a code string indicating an NOP (No Operation) instruction is not stored in the cache unit.

11. The reconfigurable device according to claim 1, wherein circuit configuration information that comprises a code string indicating an NOP (No Operation) instruction is not forwarded to the processing elements.

12. The reconfigurable device according to claim 1, wherein the cache unit forwards the circuit configuration information to the processing elements while reading out the circuit configuration information from the main memory.

13. The reconfigurable device according to claim 1, wherein the cache control unit comprises a cache controller and a state transition controller, and
wherein the cache controller determines which circuit configuration information must be forwarded and to which of the processing elements, based on control information supplied from the state transition controller.

14. The reconfigurable device according to claim 1, wherein the cache unit caches circuit configuration information other than an NOP (No Operation) instruction.

15. The reconfigurable device according to claim 1, wherein one of the processing elements comprises:
a configuration memory;
an ALU (Arithmetic Logic Unit); and
wire connection switches for connecting said one of the processing elements to another one of the processing elements via a data wire,
wherein the configuration memory stores the circuit configuration information including computation information to the ALU, and wire connection information of the wire connection switches.

16. The reconfigurable device according to claim 15, wherein said one of the processing elements performs a computation on data supplied from said another one of the processing elements via the data wire, and supplies data acquired by the computation to said another one of the processing elements via the data wire, and
wherein the ALU performs the computation on supplied data in accordance with the computation information stored in the configuration memory.

17. The reconfigurable device according to claim 8, wherein said each of said processing elements sets a code string indicating an NOP (No Operation) instruction in a specified memory area, and
wherein the cache control means reads out the selected circuit configuration information from the main memory means, stores the read-out circuit configuration information in the cache means, and sends forward the circuit configuration information to the processing element from the cache means only when the selected circuit configuration information comprises a code string other than a code string indicating the NOP instruction.

18. The reconfigurable device according to claim 8, wherein the cache control means transmits a signal to said each of said processing units, the signal being for specifying a memory area for storing circuit configuration information to be forwarded,
wherein said each of said processing elements sets a code string indicating a predetermined instruction in the specified memory area upon receiving the signal,
wherein the cache control means reads out the selected circuit configuration information from the main memory means, stores the read-out circuit configuration information in the cache means, and sends forward the circuit configuration information to said each of said processing elements from the cache means only when the selected circuit configuration information comprises a code string other than a code string indicating the predetermined instruction, and
wherein the code string indicating the predetermined instruction comprises a code string indicating the NOP instruction.

19. The reconfigurable device according to claim 8, wherein circuit configuration information that comprises a code string indicating an NOP (No Operation) instruction is not stored in the cache means.

20. The reconfigurable device according to claim 8, wherein the cache means caches circuit configuration information other than an NOP (No Operation) instruction.

* * * * *